June 21, 1949. J. BERGREN 2,473,564
WEEDLESS FISHHOOK
Filed July 13, 1946

Inventor
Julius Bergren
By his Attorneys
Merchant & Merchant

Patented June 21, 1949

2,473,564

UNITED STATES PATENT OFFICE 2,473,564

WEEDLESS FISHHOOK

Julius Bergren, Minneapolis, Minn., assignor to Joseph A. Bousquet

Application July 13, 1946, Serial No. 683,383

2 Claims. (Cl. 43—43.2)

My invention relates to weedless fish hooks, the objects and advantages of which will become apparent from the following detailed specification, appended claims, and attached drawings.

Referring to the drawings wherein like characters indicate like parts throughout the several views.

Figure 1:
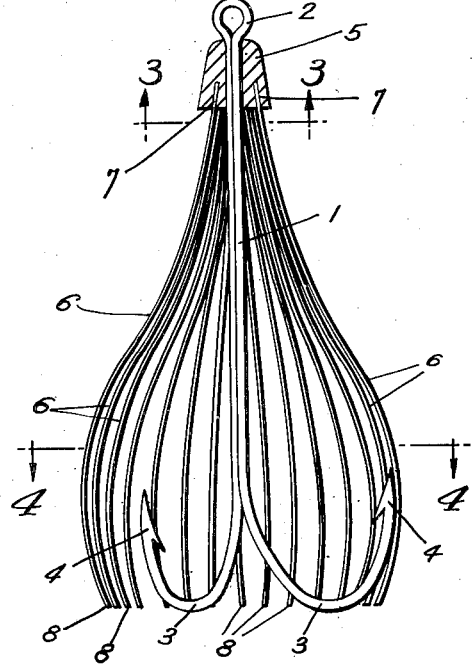
Fig. 1 is a vertical axial section of my novel hook.
Figure 4:
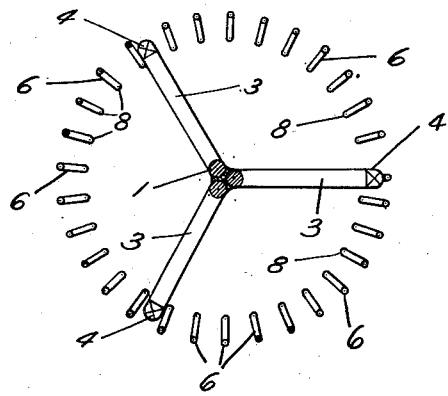
Fig. 4 is a sectional view taken on the line 4—4 of Fig. 1.

Referring with greater particularity to the drawings, the numeral 1 indicates the shank or elongated body portion which terminates in an anchoring eye 2 at one end and in a plurality of circumferentially-spaced radially-extending hooks 3 on the opposite end. Hooks 3 are of the conventional type having the tapered barbs 4 at their extreme outer ends. Body portion 1 may be formed of a single piece of steel of any desired cross sectional shape or may be made by the welding, or otherwise securing together, the shanks of the two or more single hooks.

Preferably, and as shown, shank 1 has anchored thereto, adjacent the anchoring eye 2, a circumferentially-extending radially-projecting collar 5, to the outer end of which are secured a plurality of resilient weed deflecting fingers 6. As shown, the inner ends of the resilient fingers 6 are anchored in a circumferentially-extending axially-projecting channel 7 in the collar 5 in close (preferable side by side touching) relationship.

Figure 2:
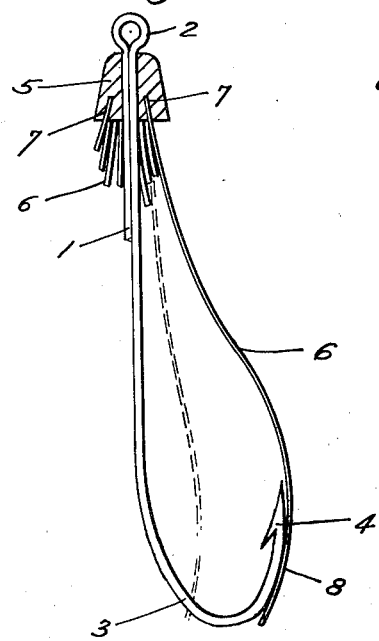
Fig. 2 is a fragmentary sectional view corresponding to Fig. 1 with some parts broken away and with the position of one of the parts being shown by dotted lines.
Figure 3:
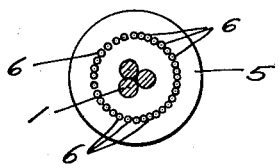
Fig. 3 is a sectional view taken on the line 3—3 of Fig. 1.

Resilient fingers 6, as shown particularly by reference to Figs. 1 and 2, diverge outwardly with respect to the shank 1 to an intermediate point where they form, collectively, a protective cage about the hooks 3.

It will be noted that the extreme free ends 8 are bent inwardly to conform substantially to that portion of the hooks 3 which is immediately adjacent thereto, as shown particularly in Fig. 2. It will likewise be noted that the free ends 8 of the resilient fingers 6 extend axially outwardly beyond the barb 4 and terminate substantially in the plane of the bottom or closed end of the hocks 3, radially outwardly thereof.

In this manner, I provide a positive weedless fish hook, that is, one which has no exposed side through which weeds could penetrate to entangle the hooks. Furthermore, the resilient fingers 6, which are made from extreme fine wire, will be pressed inwardly to the position of the dotted line in Fig. 2 when the mouth of an attacking fish is closed about the hooks 3.

Furthermore, I have found it desirable to make the shank portion 1 of my novel hook longer than the conventional hooks in order that the resilient fingers 6 may exert but a minimum of resistance to the mouth of an attacking fish.

This novel weedless hook has been thoroughly tried and found to be completely satisfactory for the purposes above set forth.

What I claim is:

1. In a device of the class described, an elongated shank terminating in an eye at one end and a plurality of circumferentially-spaced radially-extended hooks at the other end, and a plurality of resilient weed-deflecting fingers operatively anchored to said shank adjacent said eye, said fingers diverging outwardly with respect to the shank to a point intermediate their ends to collectively form a protective cage radially outwardly of the points of the hooks, the free ends of said fingers extending axially beyond the barbs and conforming substantially to the contour of the hooks.

2. The structure defined in claim 1 in which said fingers terminate in the plane of the bottom of the hooks but radially outwardly thereof.

JULIUS BERGREN.

REFERENCES CITED

The following references are of record in the file of this patent:

UNITED STATES PATENTS

| Number | Name | Date |
|---|---|---|
| 863,078 | Merz | Aug. 13, 1907 |
| 1,989,460 | Porter | Jan. 29, 1935 |

FOREIGN PATENTS

| Number | Country | Date |
|---|---|---|
| 727,270 | France | June 15, 1932 |